United States Patent [19]

Hopkins et al.

[11] Patent Number: 5,620,599
[45] Date of Patent: Apr. 15, 1997

[54] LOW HOLD-UP VOLUME FILTER ASSEMBLY

[75] Inventors: Scott D. Hopkins, Dryden; Timothy P. Pierce, Syracuse, both of N.Y.

[73] Assignee: PALL Corporation, East Hills, N.Y.

[21] Appl. No.: 467,319

[22] Filed: Jun. 6, 1995

Related U.S. Application Data

[63] Continuation of Ser. No. 275,871, Jul. 15, 1994, Pat. No. 5,462,675.

[51] Int. Cl.⁶ .................................................. B01D 27/08
[52] U.S. Cl. ................. 210/420; 210/437; 210/440; 210/443; 210/455; 210/456; 210/489; 210/497.01; 210/498; 55/501
[58] Field of Search .................................. 210/248, 306, 210/308, 309, 323.2, 339, 418, 419, 420, 437, 440, 443, 455, 456, 457, 488, 489, 497.01, 493.5, 498; 55/476, 492, 498, 500, 501, 520, 521

[56] References Cited

U.S. PATENT DOCUMENTS

| | | |
|---|---|---|
| 729,693 | 6/1903 | Steinkoenig . |
| 2,420,414 | 5/1947 | Briggs ................................ 210/493.1 |
| 2,600,150 | 6/1952 | Abendroth . |
| 3,109,809 | 11/1963 | Verrando, Jr. . |
| 3,276,594 | 10/1966 | Gwilliam ................................ 210/350 |
| 3,291,314 | 12/1966 | Rosaen . |
| 3,648,842 | 3/1972 | Zievers . |
| 4,246,122 | 1/1981 | Keat . |
| 4,302,333 | 11/1981 | Cosack et al. . |
| 4,526,688 | 7/1985 | Schmidt, Jr. et al. . |
| 4,851,136 | 7/1989 | Fanqing et al. ........................ 210/350 |
| 4,902,420 | 2/1990 | Pall et al. . |
| 5,030,345 | 7/1991 | Thomas . |
| 5,100,551 | 3/1992 | Pall et al. . |
| 5,174,896 | 12/1992 | Harms, III ........................ 210/493.1 |

FOREIGN PATENT DOCUMENTS

| | | |
|---|---|---|
| 0213930 | 3/1987 | European Pat. Off. . |
| 0520737 | 12/1992 | European Pat. Off. . |

Primary Examiner—W. L. Walker
Attorney, Agent, or Firm—Leydig, Voit & Mayer

[57] ABSTRACT

A filter assembly for decreasing fluid hold-up waste and providing uniform flow while maintaining desired flow rates and pressures comprises a housing, a filter element including first and second end caps and a filter fastened therebetween, and a sleeve. The sleeve is positioned around the filter and may be joined to the first and second end caps, thereby forming the cage as a single integral unit which is positioned within the housing.

12 Claims, 2 Drawing Sheets

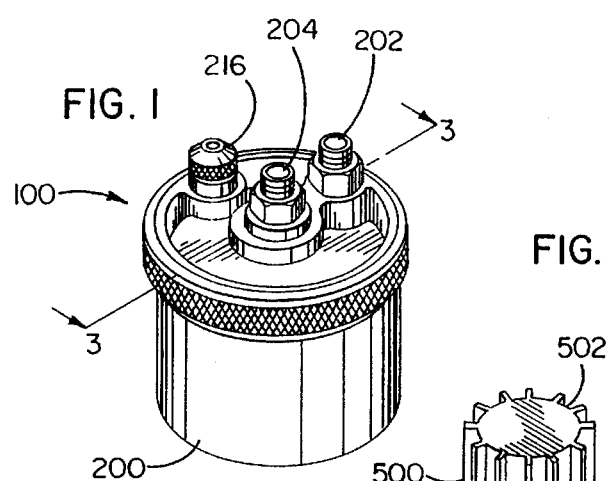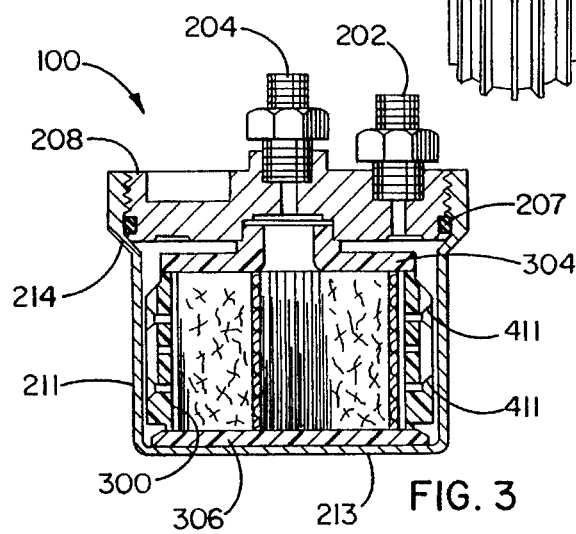

LOW HOLD-UP VOLUME FILTER ASSEMBLY

This disclosure is a continuation of patent application Ser. No. 08/275,871, filed Jul. 15, 1994, now U.S. Pat. No. 5,462,675.

BACKGROUND OF THE INVENTION

1. Field of the Invention

The present invention relates to a filter assembly, and more particularly, to a low hold-up volume filter assembly which provides for reduced fluid hold-up volume waste when replacing filters and for even flow distribution through the filter during normal operation.

2. Discussion of the Prior Art

A potentially costly problem associated with the use of any filter assembly is the problem of hold-up volume waste. When a filter element must be replaced, typically during routine maintenance, a portion of the fluid remains within the filter element housing. The remaining fluid generally cannot be reused due to possible contamination; therefore, this excess fluid must be disposed of, and depending upon the fluid, the replacement of the fluid can be costly. For example, in the integrated circuit industry, photo lithography is a technique utilized in various mask work procedures. Photoresist is a light sensitive chemical mixture which is used in photo lithography. In the photo lithography procedure, the photoresist is pumped onto a spinning disc which spreads the viscous photoresist over the particular work product. The pump assembly utilized has a filter housing that accepts a small disposable filter which must be replaced periodically and excess photoresist in the filter housing is lost. A typical positive photoresist can cost up to six hundred dollars or more per gallon, making waste extremely costly. In addition to the direct cost of replacing the wasted fluid, there is the cost of disposal. There are environmental factors which need to be considered in the disposal of certain chemicals thereby making disposal as potentially costly as buying new chemicals.

Another typical problem encountered in filter use is the problem of uneven fluid flow. For example, where more fluid flows through the upper portion of a filter element than through the lower portion, more dirt and/or other debris is deposited on the upper portion of the filter element than on the lower portion. This uneven loading of the filter element can shorten the life of the filter element, which results in more frequent replacement of the filter element and increased material and labor costs, as well as longer system down time.

SUMMARY OF THE INVENTION

In accordance with one aspect, the present invention is directed to a filter assembly. The filter assembly comprises a housing, a filter element, and a sleeve. The housing has an inside diameter and an inlet and outlet port that defines a fluid flow path. The filter element includes a filter having a diameter less than the inside diameter of the housing. The filter is disposed within the housing in the fluid flow path. The sleeve is positioned between the housing and the filter and is dimensioned to occupy at least 80% of the volume between the filter and the housing.

In accordance with another aspect, the present invention is directed to a filter assembly. The filter assembly comprises a housing, a filter, and a sleeve. The housing has an inside diameter and an inlet and outlet that define a fluid flow path. The filter, which has a diameter less than the inside diameter of the housing, is disposed within the housing in the fluid flow path. The sleeve has an outside diameter approximately equal to the inside diameter of the housing and is positioned between the housing and the filter. The sleeve includes at least one groove arranged to provide fluid communication between an outer periphery of the sleeve and the inlet or outlet of the housing. The sleeve also includes at least one flow aperture arranged to provide fluid communication between the at least one groove and the filter.

In accordance with another aspect, the present invention is directed to a filter assembly. The filter assembly comprises a housing, a filter, and a sleeve. The housing has an inside diameter and an inlet and outlet that define a fluid flow path. The filter, which has a diameter less than the inside diameter of the housing, is disposed within the housing in the fluid flow path. The sleeve is positioned between the housing and the filter. The sleeve includes at least one groove arranged to provide fluid communication between an outer periphery of the sleeve and the inlet or outlet of the housing and at least one flow aperture arranged to provide fluid communication between the at least one groove and the filter. The filter assembly also comprises an annular passage arranged to provide fluid communication between the at least one groove and the inlet or outlet of the housing.

The filter assembly for reducing fluid hold-up volume provides for minimizing waste and improved filtering efficiency. The filter assembly utilizes a sleeve to reduce the gap between the housing and filter, thereby reducing the volume of fluid within the filter assembly. Having less fluid within the filter assembly at any given time eliminates potential waste during replacement of the filter element, because during replacement, any fluid trapped within the housing is disposed of, and thus wasted. Improved efficiency is achieved by maintaining an even flow of fluid over and through the filter. The sleeve comprises channels having flow apertures which direct the fluid to and over the filter. By maintaining an even flow of fluid, the entire filter is utilized thereby avoiding fouling in a particular location.

The filter assembly for reducing fluid hold-up volume provides for an efficient and low cost means of decreasing fluid hold-up volume waste and for generating even flow over and through the filter while maintaining the flow rates and pressures required for system operation. The filter assembly is easily and inexpensively manufactured, and existing filter systems can be simply retrofit with the filter assembly of the present invention. The filter assembly can be utilized in any system requiring low to medium filtration rates.

BRIEF DESCRIPTION OF THE DRAWINGS

FIG. 1 is a perspective view of the filter assembly for reducing hold-up volume of the present invention.

FIG. 2 is an exploded perspective view of the filter assembly illustrated in FIG. 1.

FIG. 3 is a sectional view of the filter assembly illustrated in FIG. 1 taken along section line 3–3; dimensions have been exaggerated for illustrative purposes.

FIG. 4 is a section view of an alternate embodiment of the filter assembly illustrated in FIG. 1 taken along section line 3–3; dimensions have been exaggerated for illustrative purposes.

FIG. 5 is an enlarged isometric view of the plug utilized in the embodiment of the filter assembly illustrated in FIG. 4.

DETAILED DESCRIPTION OF THE PREFERRED EMBODIMENTS

Figure 6:
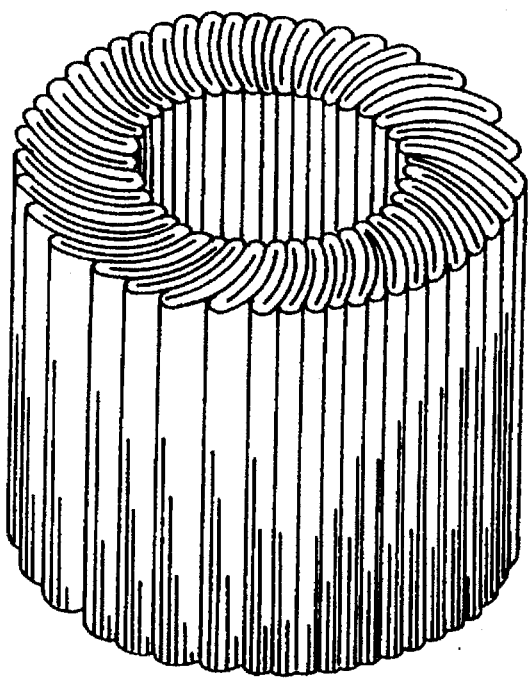
FIG. 6 is an illustration of a filter having pleats in a laid-over configuration.

A filter assembly embodying the present invention provides for an efficient and low cost means of decreasing fluid hold-up volume waste and providing uniform flow distribution along the filter element while maintaining desired system flow rates and pressures. In accordance with the invention, the filter assembly utilizes one or more components which fit into a filter housing and occupy a significant portion of the volume of the housing, thereby leaving less fluid in the housing during a filter change. These components are preferably configured to provide very small, even negligible, pressure drops and even flow distribution along a filter disposed in the filter housing.

As shown in FIGS. 1–3, one filter assembly 100 embodying the present invention generally comprises a filter housing 200, a filter element 300, and a sleeve 400. The filter housing may be configured in a variety of ways. For example, in the illustrated embodiment, the filter housing 200 is substantially cylindrical and comprises a container portion 206 and a cover portion 208 which are removably connected to one another, e.g., by threaded regions on the container and cover portions 206 and 208., respectively. The container 206 has a lower section 210 which houses the filter element 300 and the sleeve 400, and an upper section 212 which is designed to receive the cover 208. The lower section 210 may include a generally cylindrical side wall 211 having an inside diameter and an end wall 213 attached to the side wall 211. The upper section 212 may have a greater diameter than the lower section 210 in order to receive the cover 208, which may have a diameter substantially equal to that of the lower section 210. A stepped or tapered shoulder 214 may extend between the lower and upper sections 210 and 212, and the shoulder 214 may serve as a seat for the cover 208 and provide for a fluid tight seal. A seal such as an O-ring 207 may be utilized to provide for an additional seal between the container 206 and the cover 208.

The filter housing 200 includes an inlet port 202 and an outlet port 204 which define a fluid flow path through the filter assembly 100. The inlet and outlet ports may be variously positioned, e.g., on opposite sides of the housing. In the illustrated embodiment, both the inlet port 202 and the outlet port 204 are disposed in the cover 208. The inlet port 202 may serve as a means for connecting the filter assembly to an inlet line of the external system, not shown, and the outlet port 204 may serve as a means for connecting the filter assembly to an output line of the external system, not shown. In the illustrated embodiment, the inlet and outlet ports 202 and 204 are threaded male connectors; however, any suitable coupling means would suffice. A vent 216, which is normally closed but occasionally opened to vent air or any other gas from the filter housing 200, may also be provided.

The material utilized to construct the filter housing 200 depends upon a variety of factors including the type of fluid being filtered, for example, is the material compatible with the fluid, and the pressure requirements of the system in which the filter assembly 100 is utilized, for example, is the material utilized structurally able to withstand high pressure fluid flow. In general, filter housings are fabricated from metallic or polymeric materials. In the illustrated embodiment, the filter housing 200 is constructed from stainless steel.

The filter element 300 is disposed within the filter housing 200 in the flow path defined by the inlet and outlet ports 202 and 204. The filter element 300 may have any suitable configuration. For example, in the illustrated embodiment the filter element 300 is substantially cylindrical and preferably has an outer diameter which is less than the inner diameter of the side wall 211 of the filter housing 200. The filter element 300 generally comprises a filter 302 extending between first and second end caps 304 and 306. The filter 302 can be formed from any filter medium utilized for fluid filtration. For example, the filter medium may include fibrous materials such as a mass of fibers, fibrous mats, woven or non-woven fibrous sheets, and fibrous depth filters formed, e.g., from natural, polymeric or glass fibers; porous membranes, such as supported or non-supported microporous membranes formed, e.g., from a polymeric material; porous foam; and porous metals or ceramics. Alternatively, the filter 302 may have any appropriately hollow configuration, such as a pleated or tubular cylinder. For example, the filter may have a laid-over pleat configuration as disclosed in International Publication No. WO 94/11082, which is incorporated by reference. A laid-over pleat configuration is particularly advantageous because it provides more filtration surface area within a given volume and reduces the hold-up volume of the filter element. In a preferred embodiment, the filter comprises a substantially cylindrical, hollow, laid-over pleated filter having a microporous polymeric membrane serving as a filter medium and upstream and downstream polymeric meshes serving as support and drainage media. The filter 302 comprising pleats in a laid-over configuration is illustrated in FIG. 6.

The first and second en caps 304 and 306 are attached to the first and second ends 308 and 310 of the filter 302 and thus seal the ends of the filter 302 and prevent by-pass of fluid around the filter 302. In addition, the end caps 304 and 306 may serve to position and hold the filter 302 in substantially axial alignment within the filter housing 200 and provide support therefor. The ends of the filter 302 are attached to the first and second end caps 304 and 306 in any suitable manner which prevents fluid bypass. For example, the first and second ends 308 and 310 of the filter 302 may be bonded to the first and second end caps 304 and 306, respectively, by a bonding agent such as an adhesive or a solvent. Alternatively, the first and second ends 308 and 310 of the filter 302 may be attached to the first and second end caps 304 and 306, respectively, by melt or fusion bonding, spin or sonic welding, potting, or in any other suitable manner.

The end caps may be open or blind and may have any suitable configuration. For example, in the illustrated embodiment, the first end cap 304 is open and generally comprises a cylindrical disc 311 and a fitting 312 that extends from the disc 311. The disc 311 has a substantially annularly shaped opening that projects through the fitting 312. The fitting 312 protrudes into and may be sealed to the outlet port 202 of the filter housing 200, thereby fluidly coupling the hollow interior of the filter element 300 and the outlet port 202 via the opening in the first end cap 304. The second end cap 306 may be a solid cylindrical disc which forms a blind end on the filter element 300. The first and second end caps 304 and 306 may be formed from any suitable material impervious to fluid flow, such as a polymeric material.

In accordance with one aspect of the invention the sleeve 400 is positioned in the filter housing 200 substantially surrounding the filter 302 and occupies a significant portion of the volume between the filter housing 200 and the filter 302, e.g., at least about 80% of the volume. Preferably, the sleeve occupies substantially the entire volume and thus virtually fills the volume of the gap between the larger diameter filter housing 200 and the filter 302. By occupying a significant portion of the volume between the filter housing 200 and the filter 302, the sleeve 400 greatly reduces the hold-up volume in the filter housing 200.

The sleeve may be disposed in the filter housing in any suitable manner. For example, the sleeve may be loosely positioned in the lower section of the container between the side wall of the container and the filter of the filter element. The sleeve and the filter element may then be clamped in place between the end wall and the cover by tightening the cover onto the container of the filter housing. Alternatively, the sleeve may be fixed to the filter housing. For example, the sleeve may be fixed to the side wall of the container or it may depend from the cover. In a preferred embodiment, the sleeve is fixed to the filter element, surrounding the filter, and therefore additionally serves as a cage protecting the filter. The filter element may thus be formed as a single, integral unit comprising end caps, filter, and sleeve rigidly fixed together.

For example, as shown in FIG. 3, the first and second end caps 304 and 306 may have outer diameters greater than the outer diameter of the filter 302 and greater than the inner diameter of the sleeve 400. The sleeve 400, which may be substantially cylindrical, may then be connected to the first and second end caps 304 and 306, for example, in the same manner as the ends of the filter 302, forming a cage around the filter 302. The inner diameter of the cage 400 may be approximately equal to or somewhat greater than the outer diameter of the filter 302, while the outer diameter of the cage 400 may be approximately equal to or somewhat less than the inner diameter of the sidewall 211 of the filter housing 200. Thus, the cage 400 extends along a significant portion, i.e., at least about 80 to 90% of the gap width between the filter housing 200 and the filter 302 and along a significant portion, i.e., at least about 80 to 90% of the gap height, occupying a significant portion of the volume of the gap.

The sleeve is also preferably configured to provide a sufficient and evenly distributed flow of fluid to or from the filter while causing at most a very small pressure drop between the inlet port and the filter, i.e., less than about 10% of the pressure drop across the filter and more preferably less than about 5% of the pressure drop across the filter. For example, in the illustrated embodiment, the sleeve 400 comprises a plurality of channels 411 formed in the outer periphery of the sleeve 400 and a plurality of flow apertures 422 formed in the channels 411 and communicating through the sleeve 400. The channels 411 are preferably formed in any suitable pattern which widely distributes the fluid along the outer periphery of the sleeve 400. As shown in FIG. 2, the channels 411 may be formed in four generally I-shaped patterns. Each I-shaped pattern has first and second circumferentially oriented paths 416 and 418 and one axially oriented path 420. The axially oriented path 420 extends from one edge 402 of the sleeve 400, through the first circumferentially oriented path 416 and terminates in the second circumferentially oriented path 418.

The channels and the flow apertures are preferably configured to provide adequate flow rates, even flow distribution, and very small pressure drops as fluid flows to or from the filter. For example, the channels may have any suitable shape, including semicircular or rectangular. In the illustrated embodiment, the channels are generally V-shaped. The volume of the channels and the area of the flow apertures may depend on factors such as inlet flow rates and fluid viscosity and may vary along the length of a channel or from flow aperture to flow aperture. In the illustrated embodiment, there are seven flow apertures 422 in each of four I-shaped channel patterns, but more or less channels and flow apertures can be utilized. Generally, the total area represented by all of the flow apertures 422 preferably exceeds the area of the inlet or outlet port 202 and 204 in order to maintain very small pressure drops between the inlet port and the filter. For example, the total area of all the flow apertures 422 may exceed the area of the inlet or outlet port 202 and 204 by at least a factor of four. In the preferred embodiment, the total area of all the flow apertures 422 exceeds the area of the inlet or outlet port 202 and 204 by a factor of ten, and the pressure drop between the inlet port and the filter is negligible, i.e., less than 1 to 5% of the pressure drop across the filter.

The depth of the channels may be equal to but is preferably less than the thickness of the sleeve. For example, as shown in the illustrated embodiment the depth of the V-shaped channels 411 is constant and defines a diameter which is greater than the inside diameter but less than the outside diameter of the sleeve 400. The outside diameter of the first end cap 302 is preferably no greater than the diameter defined by the bottom of the V-shaped channels 411 so that when the first end cap 304 is attached to the sleeve 400, it does not interfere with fluid flow between the inlet port 202 and the channels 411. Further, the outer edge of the sleeve 400 at the first end cap 304 preferably has a bevelled section 408 which provides a large opening between the inlet port 202 and the channels 411 and directly communicates with each axial channel path 420. This opening is large enough not to be blocked by any excess bonding material generated when the first end cap 304 is attached to the sleeve 400 and so the excess material does not interfere with fluid flow into the channels 411.

Although the sleeve of the illustrated embodiment has several channels along its outer surface which feed flow apertures, the sleeve may be configured in a variety of other ways. For example, the sleeve may have flow apertures only along the edge of the sleeve under the first end cap. These flow apertures could communicate through the sleeve with channels distributed along the inner surface of the sleeve, which would direct fluid to or from the filter. Alternatively, the sleeve may have an outside diameter which is somewhat less than the inside diameter of the sidewall of the housing, providing a generally annular space between the sleeve and the housing which would fluidly communicate with the inlet port. The sleeve then need not have any channels but only flow apertures which would direct the fluid from the space between the filter housing and the sleeve through the sleeve to the filter. Alternatively, the sleeve may have no channels nor any flow apertures. The first end cap may have openings which direct fluid from the inlet port to a space between the sleeve and the filter.

In all of the embodiments, the sleeve occupies a significant portion of the volume between the filter and the housing and the sleeve has little or no void volume within it, thereby providing for reduced fluid holdup volume waste. In particular, the void volume ratio of a sleeve embodying the present invention is very low, e.g., no more than about 20%, where the void volume ratio is the ratio, expressed as a percent, of the void volume of the channels and flow apertures within the envelope defined by the sleeve to the volume of the envelope. For example, in the illustrated embodiment the volume of the envelope is the area defined between the inside diameter and outside diameter of the sleeve 400 multiplied by the height of the sleeve 400, while the void volume is the total volume of the channels 411 and flow apertures 422. In preferred embodiments, the void volume ratio is preferably less than or equal to about 10%.

The sleeve may be formed from any suitable material preferably a material which is impervious to fluid flow. For example, the sleeve may be formed from a rigid, relatively dense metallic or polymeric material. Alternatively, the sleeve may be fashioned from a more flexible material, such as a closed-cell foam.

In operation, fluid which is to be filtered enters the filter assembly 100 through the inlet port 202 and flows past the periphery of the first end cap 304 and into the axially oriented paths 420 of each of the four sets of I-shaped channels. The fluid then flows through the axial and circumferential channels, through the flow apertures 422, and into the space between the inside of the sleeve 400 and the exterior of the filter 302. The flow apertures 422 are preferably located to evenly distribute the fluid into this space and hence through the filter 302. The filtered fluid then flows through the extension fitting 312 protruding from the first end cap 304 and exits the filter housing 200 via the output port 204. Alternatively, fluid may be directed inside-out through the filter element 300.

Once the filter 302 become sufficiently fouled to require replacement, flow is terminated and the cover 208 is removed from the filter housing 200. The filter element 300 and the sleeve 400 may then be removed from the container 206. Because the sleeve 400 occupied a significant portion of the volume between the filter housing 200 and the filter 302, there is little waste fluid remaining in the filter housing 200 when the filter element 300 and the sleeve 400 are removed. The housing 200 may then be cleaned, a new filter element 300 and sleeve 400 may be inserted in the container 206, and the cover 208 may be reconnected to the container 206. Alternatively, where the sleeve is separate from the filter element, the sleeve may be cleaned and reused with the new filter element.

As shown in FIGS. 4 and 5, another filter assembly 100 embodying the invention is similar to the embodiment shown in FIGS. 1 through 3 but includes a plug 500 in addition to the sleeve 400 of FIGS. 1 through 3. The plug 500 is disposed within the region defined by the hollow interior of a filter element 300 and occupies a significant portion of the volume of the region, i.e., at least about 80% of the volume, to reduce the-hold-up volume in the filter housing 200. The plug 500 preferably has at least one channel 502 on the periphery of the plug 500, and ideally a plurality of channels 502 spaced around the outer periphery of the plug 500 to channel fluid to form the filter 302. The plug 500 may be positioned within the hollow interior of the filter element without being attached to the filter element. Preferably, the plug 500 is attached to the filter element 300, e.g., at the end caps 304 and 306, and serves as a filter core supporting the filter against inwardly directed forces.

Although shown and described is what is believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated but should be construed to cohere with all modifications that may fall within the scope of the appended claims.

What is claimed is:

1. A filter assembly comprising:
   (a) a housing having an inside diameter and an inlet port and an outlet port defining a fluid flow path therethrough;
   (b) a filter element comprising a filter having a diameter less than the inside diameter of the housing, the filter being disposed within the housing in the fluid flow path; and
   (c) a sleeve positioned between the housing and the filter, the sleeve dimensioned to occupy at least 80% of the volume between the filter and the housing.

2. The filter assembly according to claim 1, wherein the sleeve is dimensioned to occupy substantially the entire volume between the filter and the housing.

3. The filter assembly according to claim 2, wherein the sleeve comprises a substantially cylindrical configuration having an inside diameter substantially equal to the diameter of the filter and an outside diameter substantially equal to the inside diameter of the housing.

4. The filter assembly according to claim 1, wherein the sleeve comprises a fluid impervious material.

5. The filter assembly according to claim 4, wherein the fluid impervious material comprises at least one of a metallic material and a polymeric material.

6. A filter assembly comprising:
   (a) a housing having an inside diameter and having an inlet and an outlet which define a fluid flow path therethrough;
   (b) a filter having a diameter less than the inside diameter of the housing, the filter being disposed within the housing in the fluid flow path; and
   (c) a sleeve having an outside diameter approximately equal to the inside diameter of the housing and positioned between the housing and the filter, the sleeve including:
      at least one groove arranged to provide fluid communication between an outer periphery of the sleeve and the inlet or outlet of the housing, and
      at least one flow aperture arranged to provide fluid communication between the at least one groove and the filter.

7. The filter assembly according 6, wherein the sleeve comprises a plurality of axially mounted grooves and a plurality of flow apertures.

8. The filter assembly according 6, wherein the filter comprises pleats in a laid-over state.

9. The filter assembly according 6, wherein the sleeve comprises a plurality of grooves and a plurality of flow apertures, and the filter comprises pleats in a laid-over state.

10. A filter assembly comprising:
    (a) a housing having an inside diameter and having an inlet and an outlet which define a fluid flow path therethrough;
    (b) a filter having a diameter less than the inside diameter of the housing, the filter being disposed within the housing in the fluid flow path;
    (c) a sleeve positioned between the housing and the filter, the sleeve including:
       at least one Groove arranged to provide fluid communication between an outer periphery of the sleeve and the inlet or outlet of the housing, and
       at least one flow aperture arranged to provide fluid communication between the at least one groove and the filter; and
    (d) an annular passage arranged to provide fluid communication between the at least one groove and the inlet or outlet of the housing.

11. The filter assembly according to claim 10, wherein the sleeve comprises a plurality of grooves and a plurality of flow apertures, and the filter comprises pleats in a laid-over state.

12. The filter assembly according to claim 10, wherein the annular passage is in fluid communication with the at least one groove and the inlet or outlet of the housing.

* * * * *